Nov. 3, 1970  H. R. BAYLIS ET AL  3,538,413
STEPPED DRIVEN DIFFERENTIALLY GEARED MOTOR SYSTEM
Filed April 4, 1967
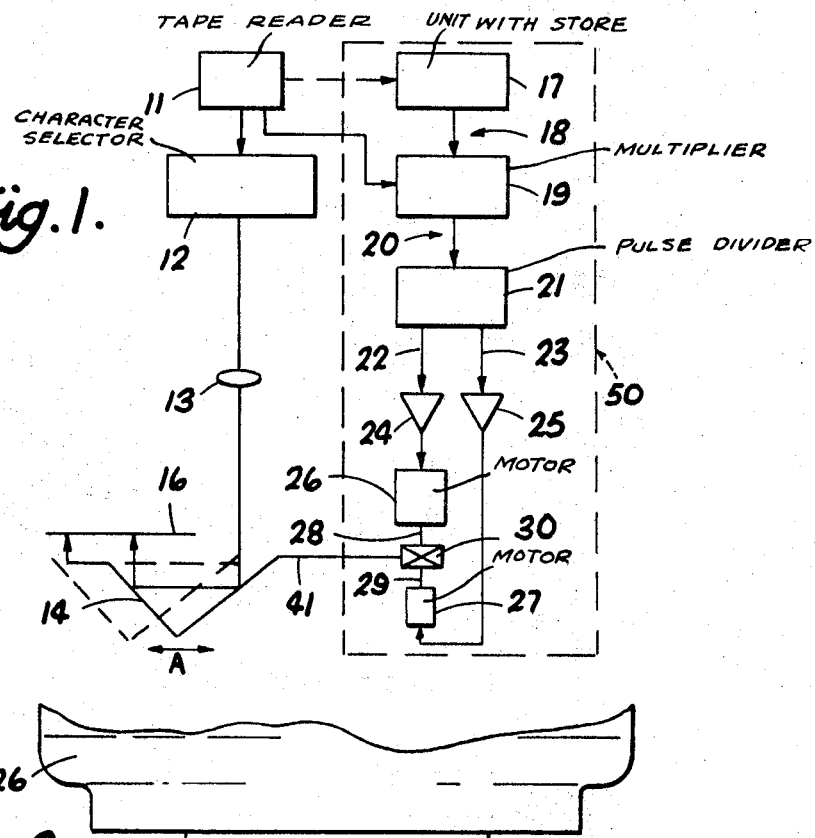
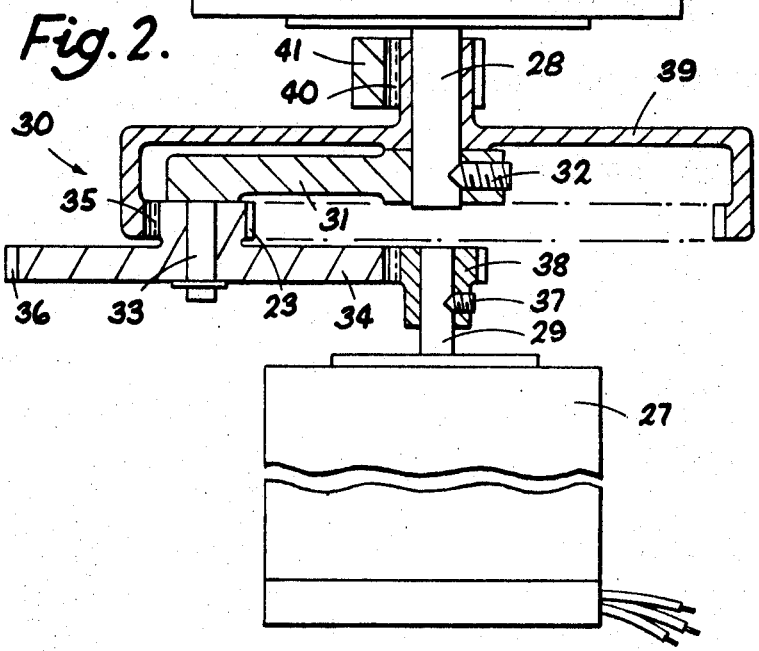
INVENTORS
HOWARD R. BAYLIS & JOSEF M. H. TIEFENTHAL
BY
Morgan, Finnegan, Durham & Pine
ATTORNEYS United States Patent Office 3,538,413
Patented Nov. 3, 1970

3,538,413
STEPPED DRIVEN DIFFERENTIALLY
GEARED MOTOR SYSTEM
Howard Raymond Baylis, East Grindstead, and Josef
Maria Herbert Tiefenthal, Reigate, England, assignors
to The Monotype Corporation Limited, London, England, a British company
Filed Apr. 4, 1967, Ser. No. 628,362
Claims priority, application Great Britain, Apr. 7, 1966, 15,645/66
Int. Cl. G05b 19/18
U.S. Cl. 318—685                    4 Claims

ABSTRACT OF THE DISCLOSURE

In photocomposing apparatus a number of pulses corresponding to required movement along a line is divided by a set number, the quotient number of pulses passing to one stepping motor (26) and the remainder number of pulses passing to another stepping motor (27). The output shaft of each motor (28) and (29) rotates through a discrete angle corresponding to the number of pulses passed to that motor, and the outputs of the motors both move a common output (41), ne pulse passed to one motor (26) producing a larger movement of the common output than one pulse passed to the other motor (27).

---

The invention relates to motor systems.

The invention provides, a motor system comprising a common output member, a plurality of motors and connecting means connecting the separate output members of each motor to the common output member, the motors being arranged to move in steps in response to respective digital input signals each unit of input signal to one motor causing a larger displacement of the common output member than each unit of input signal to another motor.

Preferably the connecting means includes mechanical gearing and the ratio of the gearing between the common output member and the said one motor is different from that between the common output member and the said other motor.

Preferably the system includes two motors and means for supplying pulsed input signals to the two motors, and the two motors are arranged so that one of the two motors causes a larger displacement of the common output member on receiving one input pulse than does the other of the two motors on receiving one input pulse.

Preferably the motors are electric motors each having a separate output member arranged to rotate in discrete steps corresponding to each input pulse received.

Preferably the means for supplying pulsed input signals includes means for producing a plurality of pulses the number of which is dependant on the required movement of the common output member.

Preferably means are provided to divide that plurality of pulses by a selected number and deliver the quotient number of pulses as an input signal to the said one motor.

Preferably the system includes only two motors and the remainder number of pulses forms an input to the other motor.

Preferably each motor is a stepping motor having a control stator and a magnetically polarisable rotor arranged to rotate in steps in dependance on the direction of the magnetic field of the stator windings. Reference is made to U.S. Pat. No. 2,982,872 for a more detailed discussion of the operation and fabrication of a stepping motor.

The invention also provides a phototype composing apparatus including a motor system as aforesaid for effecting the movement to space a succession of characters along a line.

A specific embodiment of the invention will now be described by way of example only and with reference to the accompanying drawings in which:

FIG. 1 shows a general block diagram of the apparatus and

FIG. 2 shows in more detail part of the apparatus shown in FIG. 1.

FIG. 1 shows in diagrammatical form a phototype composing machine for composing lines of character images by illuminating individually selected master characters and projecting their images onto a photographic film from which lines of print may be produced.

The selection, spacing and point size of the characters is determined by signals on a record previously produced in a keyboard controlled machine either by punching holes in a paper tape or alternatively by recording signals magnetically on a magnetic tape in accordance with a predetermined code in which the positions of holes in a line across the paper tape or positions of signals recorded on the magnetic tape correspond to the various characters, spaces and point size required.

The tape is passed through and read by a tape reader 11. The tape reader 11 passes signals produced in accordance with the singals on the tape to the character selector 12 which selects the required master character from a matrix disc or master character carrier for exposure by a flash source of light.

The selected master character may be a transparent character on an opaque background. The image of the master character is focussed by a lens system 13 and reflected through 180° by the right angled pair of mirrors 14 onto the photographic film 16. The optical part of the system is as broadly described in British Pat. No. 852,991. A succession of master characters exposed to the film 16 build up a line of exposed images and spaces on the film 16. Signals from the tape reader 11 denoting the point size control the magnification of the lens system 13 in such a way that the image of the film 16 will give the required point size in the finished line of print.

The exposed characters are spaced along the film 16 in a line by the movement of the mirrors 14 in a direction A shown in FIG. 1. This movement is controlled by a motor control system shown generally at 50 in FIG. 1. The distance moved by the mirrors 14 is dependant on the justification, the character chosen (for example the letter "i" is narrower than the letter "m") and the point size.

The apparatus for controlling the movement of the mirrors 14 comprises a unit width store 17 (which may be in a tape or some separate memory in the machine or comprise one or more additional holes on the master character disc) for receiving signals from the tape reader 11, the unit width store 17 also being connected to the set multiplier 19 by a line 18. The set multiplier 19 also receives control signals from the tape reader 11 and transmits pulses along line 20 to the pulse divider 21. The chain of pulses from the pulse divider 21 for each character is passed respectively through lines 22 and 23 to amplifiers 24 and 25. Reference is made to three texts: namely, T. C. Bartee's, Digital Computer Fundamentals, 1960, M. V. Wilkes's Automatic Digital Computers, 1957, and E. L. Braun's Digital Computer Design, 1963, for more detailed discussions of the operation and fabrication of multipliers, dividers and memory stores. The amplified signals from amplifier 24 are passed to a stepping motor 26 and the amplified signals from amplifier 25 are passed to a stepping motor 27. The stepping motors 26 and 27 each have a rotor permanently magnetically polarised along its axis of rotation and attached to the outputs 28 and 29. Arranged at one axial end of the rotor is a ring of fifty teeth which extends around the circumference of the rotor. A similar ring of fifty teeth are arranged around the circumference of the rotor at the other axial end of the rotor, the two rings of teeth being similar but offset by one tooth width relative to each other. The stators of the stepping motors 26 and 27 have eight poles surrounding the rotor, there are two windings on each stator pole wound in opposite senses to each other. Each stator pole has six teeth spaced close to the teeth on the rotor. Since there are eight stator poles there are therefore 48 stator teeth arranged in a ring surrounding each rotor ring of fifty teeth. Current may be passed selectively through each winding of the stator in either direction so that the resultant magnetic field of the stator windings may be rotated in discrete steps and may stop in one of these steps as required thereby causing the rotor to move in discrete steps and take up a required rotational position as determined by the direction of the resultant magnetic field of the stator windings. The outputs 28 and 29 of motors 26 and 27 are passed through a gearing shown generally at 30 comprising gear components 31 to 39 which transmit the drive of the motors in an additive fashion to a pinion 40 driving a rack 41. The rack 41 is connected to the mirrors 14 in such a way that the rack 41 moves the mirrors 14 in the direction "A" along the line of exposed characters on the film 16.

As shown in FIG. 2, the output shaft 28 of the stepping motor 26 is rigidly connected by a screw 32 to an arm 31 which has a shaft 33 parallel with shaft 28 attached to its end. A pinion 34 with two sets of teeth 35 and 36 rotates freely on the shaft 33. The output shaft 29 of the motor 27 is rigidly connected by a screw 37 to a pinion 38 which meshes with the teeth 36 of the pinion 34. The teeth 35 of the pinion 34 mesh with an internally toothed wheel 39, the wheel 39 driving the mirror rack 41 through the pinion 40, the pinion being rigidly connected to the wheel 39.

In the operation of the motor control system 50, as the tape passes the reader 11 signals for the selected characters are sent from the tape reader 11 to the unit width store 17. The unit width store 17 passes along line 18 a chain of pulses the number of which correspond to the basic relative width of the selected character.

The tape reader 11 also passes the signals giving the point size to the set multiplier 19. The set multiplier 19 then multiplies the number of pulses from the unit width store 17 by a number dependent on the point size as the larger the point size the larger the space each character requires. There is a pause between each chain of pulses from the set multiplier 19 representing each character. The number of pulses in a chain leaving the set multiplier 19 represent the actual space required on the film 16 and are sent along line 20 to the pulse divider 21 which divides the number of pulses for each character by a fixed number $n$; in this example $n$ is 25. The quotient number of pulses is passed to the amplifier 24 and to the stepping motor 26. Similarly the remainder number of pulses are passed to the amplifier 25 and to the stepping motor 27. The stepping motors 26 and 27 each have a built in controlling unit which causes them to rotate their output shafts 28 and 29 respectively through an angle dependent on the number of pulses supplied to each stepping motor.

Normally both motors 26 and 27 receive pulses and rotate their output shafts 28 and 29 at the same time. The gearing 30 is such that the motions of the two output shafts 28 and 29 are combined additively to move bar 41 when they rotate either simultaneously or singly.

When the number of pulses arriving at the pulse divider is less than 25, no pulses are sent to the motor 26 and hence output shaft 28 does not move. However, the output shaft 29 rotates according to the pulses received by motor 27, and thus pinion 38 rotates which rotates pinion 34 through teeth 36. Since the arm 31 is not moving this rotation is transmitted directly to wheel 39 by teeth 35 and the mirror rack 41 driven through pinion 40.

If the number of pulses received by the pulse divider 21 is an exact multiple of 25 no pulses are sent to motor 27 and hence the output shaft 29 does not move. The output shaft 28 however rotates in accordance with the pulses received by motor 26 and arm 31 rotates with shaft 28. Hence pinion 34 rotates since pinion 38 with which it meshes via teeth 36 is not moving. Thus the wheel 39 is rotated through teeth 35 and the mirror rack 41 moved by the pinion 40 on wheel 39.

If the number of pulses received by the pulse divider 21 is greater than 25 but not an exact multiple of 25 both output shafts 28 and 29 rotate in accordance with the number of pulses received by their respective motors 26 and 27. The rotations of the two shafts 28 and 29 are added together so that, as before the rack 41 is moved a distance determined by the number of pulses fed to the pulse divider 21.

In the example, motor 26 moves the rack 41 twenty five times as far as motor 27 for the same number of pulses received by each motor and the same rotation of the output shafts 28 and 29.

Thus each pulse fed to the motor 27 represents twenty five pulses fed to the pulse divider and the motor 27 moves the rack 41 on receiving one pulse a distance equal to the distance the rack 41 is moved by motor 26 when 25 pulses are fed to it.

The invention is not restricted to the details of the foregoing example. For example, other forms of gearing with the same effect may be used.

This type of motor system has other applications besides the positioning of characters on file for phototype composition. It may be used in other scalar drives where the position of a driven member is to be set to a numerical value formed of fine units. The motors could be coupled in this fashion to the leadscrew of a machine tool in order to operate the machine under numerical control techniques.

In causing the resultant magnetic field of the stepping motor stator windings, and thereby the rotor, to rotate, the magnitude of the current in the stator windings as well as the direction, may be varied.

We claim:

1. A motor system comprising a first step-type motor, a second step-type motor, a common output member for movement by the motors, and differential gearing connecting both motors to the common output member to add together movements of the two motors, which differential gearing includes a first gearing connection between the first motor and the common output member and a second gearing connection between the second motor and the common output member, the two gearing connections being of different gear ratio, the said gearing connections comprising a first rotatable shaft connected to one motor, a second rotatable shaft connected to the other motor arranged end to end with, but spaced from, the said first shaft, a radially extending arm connected to the said first shaft, a mounting pin at the end of said arm extending parallel to said first shaft, a first small pinion and a large pinion connected together and both rotatably mounted on said mounting pin, a second small pinion fixed to said second shaft and engaging the periphery of said large pinion, a large internally toothed gear wheel mounted for rotation about said first shaft and engaging the periphery of said first small pinion, and a third small pinion arranged to move the said common output member which third pinion is mounted for rotation about said first shaft and is secured to said internally toothed gear wheel for rotation therewith.

2. A motor system as claimed in claim 1 in which clamping screws are provided for releasably securing the said arm and the said second small pinion to the first and second shafts respectively.

3. A motor system as claimed in claim 1 in which the common output member is a rack engaging said third pinion.

4. A motor system as claimed in claim 1 further comprising an electrical pulse generating device for generating a number of electrical pulses proportional to the extent of movement required, and a pulse divider connected between the pulse generating device and the motors, the pulse divider having two outputs, one output being connected to the first step-type motor to deliver the quotient of the divider number to the first motor and the other output being connected to the second motor to deliver the remainder number of the pulses to the second motor, the gear ratio of the first gearing connection being higher than the gear ratio of the second gearing connection.

References Cited

UNITED STATES PATENTS

| | | | |
|---|---|---|---|
| 2,941,136 | 6/1960 | Marantette et al. | 318—23 XR |
| 3,077,555 | 2/1962 | Fredrickson | 310—49 |
| 3,189,886 | 6/1965 | Sonntag | 318—13 XR |
| 3,328,659 | 6/1967 | Ryno | 318—13 |
| 2,442,069 | 5/1948 | Ballard | 318—33 XR |
| 3,146,386 | 8/1964 | Gerber | 318—19 XR |

BENJAMIN DOBECK, Primary Examiner

U.S. Cl. X.R.

318—8, 13, 600